United States Patent Office 3,814,702
Patented June 4, 1974

3,814,702
COMPOSITION FOR PROMOTING THE POLYMERIZATION OF PHOTOPOLYMERIZABLE MASSES
Louis Bourdon, Sainte-Foy-les-Lyon, Etienne Simon, Lyon, Philippe Borrel, St.-Martin-le-Vinoux, and Jean Lehureau, Lyon, France, assignors to Progil, Paris, France
No Drawing. Filed Dec. 13, 1971, Ser. No. 207,228
Claims priority, application France, Dec. 28, 1970, 7046873
Int. Cl. C08f 1/20
U.S. Cl. 252—426
3 Claims

ABSTRACT OF THE DISCLOSURE

A composition comprising from 10 to 95 wt. percent benzoin, from 20 to 0.5 wt. percent organic acid and from 70 to 1 wt. percent solvent is a photosensitizer for the polymerization of monomers.

The present invention, relates to photosensitizing compositions which may be added to monomer masses to promote their polymerization under the effect of U.V. or analogous radiations. Such polymerizable masses are useful in particular for moldings and coatings.

There are already known a variety of types of photosensitizers for the photopolymerization of monomers or of mixtures of unsaturated polymers and monomers copolymerizable with the latter, particularly unsaturated polyesters.

These include acyloins which, depending on the substituents on the benzoin by which they are characterized, are capable of increasing the photopolymerization rate of the photosensitized polymerizable masses or of stabilizing these very same masses in the dark.

Obviously, it would be desirable to provide a benzoin which posseses both the antagonistic properties of promoting polymerization and of preventing same according to whether the mass to be polymerized in which it is incorporated is placed under ultra-violet light or is stored in the dark.

The invention solves this problem in a heretofore unknown manner by providing photosensitizing compositions adapted to be incorporated in particular in unsaturated polyester resins, which stabilizes the resins in the dark while making it possible to attain higher polymerization rates than have been attainable in the past.

These photosensitizing compositions comprise a benzoin which, according to the invention, is activated by an organic acid solution.

The presence of the organic acid enhances the capacity exhibited by benzoin to provide free radicals under the action of ultra-violet light, while the homogeneousness due to the solvent is a factor serving to attain a high polymerization rate. Surprisingly, these compositions stabilize the polymerizable mixtures maintained in the dark in which they are incorporated.

The first component of the compositions of this invention is a benzoin. This term includes any compound having the formula:

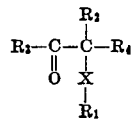

in which X is an oxygen or sulfur atom, $R_1$ and $R_2$ are, independently from one another, selected from hydrogen atoms or aliphatic or aromatic hydrocarbon radicals, and $R_3$ and $R_4$ are, independently from one another, benzene nuclei, or benzene nuclei mono-, di- or tri-substituted with alkyl, alkoxy, trihaloalkyl, metahydroxy, alkylenedioxy groups or halogen atoms.

Benzoin and its derivatives are known photosensitizers that may be prepared according to the methods described by Whitmore in Organic Chemistry, page 405, by Fisher in Berichte, 26, 2412 (1893), or by Irvine and Moodie as described in Journal Chemical Society, 91, 543, (1907).

Among the various benzoins suitable for the purposes of the invention are in particular benzoin itself, toluoin, tert.butyl-benzoin, anisoin, thiobenzoin, the phenyl, cresyl, benzyl, cyclohexyl ethers thereof and alkyl ethers thereof such as the ethyl, propyl, isopropyl, butyl, isobutyl ether, the α-alkylbenzoins and thiobenzoins such as the methyl, ethyl, propyl, allyl and the like derivatives.

Generally, the photosensitizer represents from 10 to 95% and, preferably, from 50 to 80% by weight of the composition.

The second component of the compositions of this invention is an organic acid.

Satisfactory results were obtained by selecting a readily available weak organic acid. This acid may be a monocarboxylic or polycarboxylic acid. It is frequently preferred to use dicarboxylic acids.

The chain which carries the carboxy groups of the acid is generally a hydrocarbon chain, which is frequently saturated and which, if desired, may include one or more hydroxy groups. In particular, the dihydroxy acids were found to be advantageous.

Examples of organic acids suitable for the purposes of the invention are lactic acid, oxalic acid, citric acid, benzoic acid, alkanoic acids, and the like.

Among the various acids tested heretofore, tartaric acid was found most efficient.

The acid content of the composition of the invention may be from 20 to 0.5 wt. percent. It is advantageously from 5 to 1 wt. percent.

Both the aforesaid compenents, viz., a benzoin and an acid, are dissolved in a solvent which forms the third component of the composition of this invention.

This solvent may be selected from the various organic liquids capable of solubilizing the selected benzoin and acid. The ketones were found to possess both these properties, in particular the simplest ketones such as acetone, methylethylketone, and the like.

The solvent represents about 70 to 1%, and preferably, 50 to 20% by weight of the composition.

To further improve the ternary composition of this invention, a reducing agent may be added thereto as fourth component.

Said weak reducing agent may be selected from the alcohols and particularly from the polyols. The sugars are convenient for providing this polyol function together with a beneficial additional reducing capacity. Phenol, a substituted phenol and substituted or unsubstituted polyphenols are also suitable. Other useful materials include, for example, organic phosphites, hydroquinones, arylmercaptans, alkylmercaptans etc. All of the reducing agents particularly satisfactory, etc. All of the reducing agents mentioned as well as mixtures thereof improve further both the stabilization of the polymerizable mixture maintained in the dark and the photopolymerization rate provided by the ternary composition of this invention.

One should refrain, however, from adding to the composition a reducing agent such as hydroxylamine, hydrazine or their derivatives. Such nitrogen containing derivatives improve the stability, but reduce considerably the activity of bezoin, so that they are not suitable for the purposes of the invention.

When present, the weak reducing agent comprises generally up to 5% and preferably from 0.2 to 1% by weight of the composition.

The composition is in a liquid form that is particularly conveniently incorporated in a polymerizable mass.

The liquid photosensitizing compositions of this invention are produced by mixing the components in any order, usually by dissolving the benzoin, the acid and, optionally, the reducing agent in the solvent.

To obtain a suitable stabilized and activated photopolymerizable mass, it is sufficient to add to its components from about 0.1 to about 10%, and preferably from about 0.2% to about 5% of a composition of this invention.

A large number of monomers such as acrylic monomers, methacrylic monomers, vinyl monomers, unsaturated hydrocarbons, etc., are useful photopolymerizable masses. The invention is particularly advantageous with unsaturated polyesters and their mixtures with monomers copolymerizable therewith, such as those of the above-mentioned types.

The polyester is generally prepared from unsaturated polybasic acids or acid anhydrides and polyols. Particularly preferred examples include dibasic acids or anhydrides thereof such as maleic acid, fumaric acid, chloromaleic acid, itaconic acid, citraconic acid, tetrahydrophthalic acid, mesaconic acid, and the like, it being understood that it is possible to use a mixture of such polybasic acids with saturated polybasic acids such as phthalic, succinic, adipic, azelaic acids, or others. As polyols, there are generally used diols and particularly saturated diols comprising at least 2 carbon atoms, such as ethylene glycol, propylene glycol, butylene glycol, diethylene glycol, dipropylene glycol, triethylene glycol, dimethylolbenzene, and the like. The polybasic acids and polyols are generally used for the polycondensation in substantially stoichiometric amounts.

The following examples are set forth to illustrate the invention.

A polycondensate is prepared by heating together at 200° C. a mixture of maleic anhydride (1 mole), phthalic anhydride (1 mole) and propylene glycol (2 moles); the polycondensation water is distilled until the mixture has an acid number of 40.

100 p.p.m. hydroquinone are added to this polycondensate which is then dissolved in styrene to give a polycondensate concentration of 60 wt. percent.

This solution constituted a conventional example of so-called unsaturated polyester resin and is used in all the following examples as mass to be photopolymerized or stabilized.

EXAMPLE 1 (Reference)

Various known photosensitizers are added to this unsaturated polyester resin and both the activity (setting time under U.V. radiations) (Table I) and the stability (gelling time in the dark in an oven at 60° C.) (Table II) provided by such photosensitizers are determined.

Column 2 of Table I sets forth the setting time (exothermal peak) of the unsaturated polyester resin sensitized by incorporation of 2% of the corresponding photosensitizer reported in column 1. Irradiation of the resin is achieved by means of a Philips HTQ4 lamp placed at a distance of 40 cm. from the mass to be polymerized.

TABLE I

| Photosensitizers: | Setting time, seconds |
| --- | --- |
| Benzoin | 180 |
| Methoxybenzoin | 80 |
| Isopropoxybenzoin | 120 |
| 1-Butoxybenzoin | 90 |
| Phenylthiobenzoin | 90 |

Column 2 of Table II sets forth the gelling time of the resin to be stabilized when it is maintained in the dark in an oven at 60° C. and to which has been added 2%, by weight, of the correspoding photosensitizer reported in column 1.

TABLE II

| Photosensitizers: | Gelling time, hours |
| --- | --- |
| Benzoin | 7 |
| Methoxybenzoin | 15 |
| Isopropoxybenzoin | 50 |
| 1-Butoxybenzoin | 34 |
| Phenylthiobenzoin | 20 |

EXAMPLE 2

A photosensitizing composition according to the invention is prepared as follows:

Methoxybenzoin (2 parts, by weight), tartaric acid (0.04 part, by weight), dodecyl mercaptan (0.01 part, by weight) and acetone (1 part, by weight) are mixed together.

The resulting clear solution is added to 98 parts of unsaturated polyester resin.

The activity, determined as set forth in Table I of example 1 is sixty seconds, instead of eighty seconds.

The stability, determined as set forth in Table II of example 1 is fifty hours, instead of fifteen, that is, a more than a threefold increase.

EXAMPLE 3

Another photosensitizing composition according to the invention is prepared as follows:

Isopropoxybenzoin (2 parts by weight), tartaric acid (0.06 part, by weight), trinonylphenyl phosphite (0.01 part, by weight), monomethyl hydroquinone ether (0.01 part, by weight) and methylethylketone (2 parts by weight) are mixed together.

This composition is added to 98 parts of unsaturated polyester resin.

The activity, determined as set forth in Table I of example 1 is one hundred seconds, instead of one hundred and twenty seconds.

The stability, determined as set forth in Table II of example 1, is one hundred and fifty hours, instead of fifty hours, that is, a threefold increase.

EXAMPLE 4

Compositions are prepared, containing the various photosensitizers set forth in Table III below (2 parts, by weight) together with tartaric acid (0.04 part, by weight), dodecylmercaptan (0.02 part, by weight), ditert-butyl paracresol (0.02 part, by weight) and methylethylketone (2 parts, by weight).

Each composition is added separately to 98 parts of unsaturated polyester resin.

The activity and stability determinations are reported in following Tables III and IV.

TABLE III

| Photosensitizers: | Setting time, seconds |
| --- | --- |
| Benzoin | 160 |
| 1-Butoxybenzoin | 80 |
| Phenylthiobenzoin | 70 |

TABLE IV

| Photosensitizers: | Gelling time, hours |
| --- | --- |
| Benzoin | 50 |
| 1-Butoxybenzoin | 60 |
| Phenylthiobenzoin | 70 |

It is apparent from the above that the photosensitizers exhibit enhanced activities while stability is markedly improved, increasing from seven to fifty hours in the case of benzoin and from twenty to seventy hours in the case of phenylthiobenzoin.

Having now described our invention what we claim and desire to secure by Letters Patent is:

1. A liquid photosensitizing composition adapted to be incorporated in a photopolymerizable mass and consisting essentially of from 10 to 95 wt. percent of a benzoin having the formula:

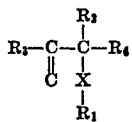

in which X is selected from the group consisting of oxygen and sulfur atoms, $R_1$ and $R_2$ are independently selected from the group consisting of hydrogen atoms and aliphatic and aromatic hydrocarbon radicals, and $R_3$ and $R_4$ are independently selected from the group consisting of benzene nuclei and benzene nuclei mono-, di- and tri-substituted with substituents selected from the group consisting of alkyl, alkoxy, tri-haloalkyl, meta-hydroxy, alkylenedioxy groups and halogen atoms and from 20 to 0.5 wt. percent of tartaric acid as activator for the benzoin dissolved in from 70 to 1 wt. percent of a solvent.

2. A composition as claimed in claim 1 additionally containing up to 5 wt. percent of a weak reducing agent selected from the group consisting of dodecylmercaptan, trinonylphenyl phosphite, monomethyl hydroquinone ether, di-tert.butylparacresol and mixtures thereof.

3. A photosensitizing composition consisting essentially of from 50 to 80 wt. percent benzoin methyl ether, from 5 to 1 wt. percent tartaric acid, from 50 to 20 wt. percent acetone and from 0.2 to 1 wt. percent dodecylmercaptan.

References Cited
UNITED STATES PATENTS

| | | | |
|---|---|---|---|
| 3,222,429 | 12/1965 | Boyd et al. | 252—426 X |
| 3,552,986 | 1/1971 | Bassemir et al. | 204—159.23 X |
| 3,616,367 | 1/1971 | Zunker | 204—159.23 X |
| 3,627,657 | 12/1971 | Nistri et al. | 204—159.23 X |
| 3,684,516 | 8/1972 | Ishii | 204—159.24 X |
| 3,699,022 | 10/1972 | Behrens et al. | 204—159.24 X |
| 2,448,828 | 9/1948 | Renfrew | 252—426 X |
| 2,647,080 | 7/1953 | Joyce | 252—426 X |

PATRICK P. GARVIN, Primary Examiner

U.S. Cl. X.R.

204—159.23, 159.24; 260—75 UA, 861, 865, 866